(12) United States Patent
Decker

(10) Patent No.: US 8,852,476 B2
(45) Date of Patent: Oct. 7, 2014

(54) METHOD FOR PRODUCING THIN FLAKE

(76) Inventor: Wolfgang Decker, Darlington, PA (US)

( * ) Notice: Subject to any disclaimer, the term of this patent is extended or adjusted under 35 U.S.C. 154(b) by 205 days.

(21) Appl. No.: 12/918,080

(22) PCT Filed: Feb. 26, 2009

(86) PCT No.: PCT/US2009/035312
§ 371 (c)(1),
(2), (4) Date: Aug. 18, 2010

(87) PCT Pub. No.: WO2009/111268
PCT Pub. Date: Sep. 11, 2009

(65) Prior Publication Data
US 2012/0007271 A1  Jan. 12, 2012

Related U.S. Application Data

(60) Provisional application No. 61/033,549, filed on Mar. 4, 2008.

(51) Int. Cl.
*B01J 2/24* (2006.01)

(52) U.S. Cl.
USPC .......................................... 264/144; 264/140

(58) Field of Classification Search
USPC .................................................. 264/140, 144
See application file for complete search history.

(56) References Cited

U.S. PATENT DOCUMENTS

| | | | |
|---|---|---|---|
| 2,941,894 A * | 6/1960 | McAdow | ..................... 106/1.18 |
| 5,156,720 A | 10/1992 | Rosenfeld | |
| 5,653,792 A | 8/1997 | Phillips | |
| 5,968,664 A | 10/1999 | Heberger et al. | |
| 2004/0146642 A1 * | 7/2004 | Josephy et al. | ............ 427/248.1 |
| 2006/0267241 A1 | 11/2006 | Argoita | |
| 2009/0286665 A1 | 11/2009 | Szuscik-Machnicki et al. | |

* cited by examiner

Primary Examiner — Robert J Grun

(57) ABSTRACT

A process for forming thin flake particles includes coating the liquid release agent over a base substrate, forming a multilayer structure by depositing a thin film over the liquid release agent, collecting the multilayer structure, and separating the thin flake from the multilayer structure using a suitable solvent. The liquid release agent comprises a curable compound that can form a solidified layer less than 0.001 mm thick onto which the thin film can be deposited. Separation requires little solvent because of the thinness of the solidified layer.

19 Claims, 2 Drawing Sheets

METHOD FOR PRODUCING THIN FLAKE

This application claims priority of U.S. Provisional Application No. 61/033549 tiled 4 Mar. 2008 and PCT/US09/35312 tiled 26 Feb. 2009.

FIELD OF THE INVENTION

The invention relates to a method for the production of thin films including particles, and particularly to a continuous process for producing thin, bright, metallic leaf pigments.

BACKGROUND OF THE INVENTION

Metal coatings for decoration and ornamentation have been used for thousands of years. More recently, metallic pigments have become commercially important as surface coatings. Metal-coated surfaces can produce aesthetic, bright, metallic finishes that can also withstand environmental conditions and weathering better than many other surfaces or surface coatings. The high cost of metals, such as gold and silver, encourages the use of thin leaf products for surface coatings. Thin leaf includes a sheet less than about 2 mm thick and typically less than about 0.1 mm thick. For example, gold leaf can be less than about 0.001 mm thick. Producing such thin leaf can be difficult and can include hammering the metal to a suitable thickness. The labor required for this process and the malleability of the metal limit the practicability of such thin leaf products. Historically, the expense of thin leaf metallic coatings had been limited its use to jewelry, porcelain, chinaware and other art objects.

An alternative to metallic leaf includes a mixture comprising thin metal flakes and a drying oil. After applying the mixture to a surface and drying, the mixture can resemble a continuous metal coating. The metal flake can be produced by any convenient process, including grinding, stamping, rolling, and milling. Reactive metals, such as aluminum, can be produced in an anaerobic environment such as in organic oil. One process for producing metallic coatings includes forming a suspension of metal particles in a suitable liquid and applying the suspension using conventional techniques such as painting or printing. This process is convenient but the resultant coating can lack the reflectivity and aesthetics of a surface coated with a true metal leaf. The shape of the metallic particles and their distribution in the dried suspension are believed to affect reflectivity.

A thin, reflective metal flake can be formed using vapor deposition, such as vacuum vapor deposition. Flakes produced by this process can better mimic traditional metal leaf. Vapor deposition can include heating a metal in a vacuum to form a metal vapor and exposing a surface to the vapor. The vapor condenses on the surface to form a metal film. The surface may be chilled to facilitate condensation. Varying factors such as the vapor pressure, temperature gradient between the vapor and the surface, and the residence time of the surface in the vapor control the thickness of the metal film and the resultant metal flake. The thickness of the metal film is usually less than 10 microns, and more usually less than 1 micron. Vapor deposition processes include methods such as thermal evaporation, electron beam evaporation, condensation, sputtering, or combinations thereof After deposition, the metal film can then be removed from the surface. Commonly, the surface includes a release coating and the metal film condenses on the release coating. The surface is passed through a solvent system which dissolves the release coating and releases the metal film into the solvent. A suspension of metal flake in the solvent is formed from which the metal flake can be separated. The metal flakes can be used in coatings, such as paints and inks, or to impart optical, mechanical or electrical properties to a product either as a coating on the product or incorporated into the product.

A common method of producing metal flakes deposits the metal film onto a surface consisting of a moving web. The web can be spooled between two reels and the process can be carried out continuously over the web. Prior to metallization the web can be coated with a dissolvable coating to better facilitate the separation of the vacuum deposited metal layer from the web. The web is thereafter soaked in a solvent solution wherein the metal film is separated from the web to produce metal flakes. This method of producing metal flakes, however, has not been wholly satisfactory. First, the method is discontinuous and can be slow because the movement of the web must either be periodically halted or the movement slow enough so that the web can be soaked in the solvent solution for some appreciable time. The nature of the process decreases production. Second, the necessity of using a web represents a considerable capital and maintenance cost because the web must frequently be replaced.

In an embodiment of this method the base substrate consists essentially of a web. The web is coated with a soluble release coating, metallized in a vapor metallization process, and repeatedly coated with release coating and metallization to create a stack of release coating and metal layer on a single web. The web is typically disposed of after the removal of the metal flake, so multiple layers on a single web can reduce amount of web needed and, consequently, the cost. Although this embodiment reduces the cost for the base substrate, there is still considerable expense as the structure must be moved repeatedly between a coating system for the application of the soluble coating and the vacuum metallization system. This increases handling and time to produce a metalized layer.

Prior art has attempted to remove the use of a base substrate to produce free standing thin film particles. This process includes coating the surface of a deposition drum with a solid release agent, such as for example a wax, and depositing a metal film onto the wax. A knife or doctor blade can scrape the release agent and the metal film from surface in a continuous process. In a typical embodiment, the moving surface is a rotatable metallic drum disposed within a vacuum chamber. Located about the periphery of the drum is at least one vacuum deposition station. The station distributes the metal film onto the surface of the rotating drum. After the metal film and release agent is scraped from the surface, the residual release agent is removed from the metal film typically in a solvent washing process. The metal film, which fractures into thin metal flake, can be separated from the solvent by, for example, evaporation or centrifugation. The solid release agent can be recycled to the vacuum chamber for redeposition onto the rotatable drum.

Alternatively, prior art has vapor deposited a release agent onto a coating drum and subsequently deposited a metal layer. The process can be a continuous process and can create a plurality of layers of release agent and metal. The multilayer stack can be removed from the deposition drum and subsequently crushed to better expose the release layer to the solvent process.

While such embodiments can overcome certain limitations of the vapor deposition process, in particular the omission of the use of a disposable and costly moving web, problems remain. For example, the processes can require vapor deposition of the release layer so that special evaporation and deposition equipment is required. The release agents described within the known state of the art are either of solid state upon deposition onto the coating drum or are solidified prior to metallization using either electron beam or plasma exposure. A solid release agent requires a potent solvent to separate from the thin metal film. A liquid release agent would be more easily separable from the metal film, but attempts to deposit metal film on a liquid surface have been ineffective.

SUMMARY OF THE INVENTION

The present invention relates to a process for forming a thin flake. The process includes applying a liquid release agent to a base substrate. The liquid release agent comprises a curable compound. At least one layer of a film is deposited on the exposed surface of the liquid release agent thereby forming a multilayer structure. The curable compound solidifies during the process and forms a solidified layer supporting the film. The process further includes removing the multilayer structure from the base substrate and separating the liquid release agent from the film.

In one embodiment, a base substrate is coated with a liquid release agent on which the thin film can be deposited. The liquid release agent comprises a curable compound that can include, for example, a curable monomer, dimer, trimer, or oligomer. A solidified layer of the curable compound can form from, for example, the heat from the deposition of the thin film. Conveniently, the curable compound will harden so that a solidified layer forms on the exposed surface of the liquid release agent. The solidified layer is preferably less than about 0.001 mm (1 µm) thick. A doctor blade removes the thin film, the solidified layer, and the underlying liquid release agent from the base substrate. The liquid release agent and the solidified layer can be removed from the thin film with little or no solvent.

In another embodiment, the base substrate is a rotatable drum disposed within a vacuum chamber. Located about the periphery of the drum is at least one vacuum deposition station. The drum is coated with a liquid release agent comprising a curable compound. A solidified layer forms during the deposition process. The solidified layer can be less than about 100 Å. The station deposits a thin film onto the solidified layer, and a doctor blade removes the thin film, the solidified layer and the liquid release agent from the base substrate. Compared to traditional processes using wax as a release agent, the thinness of the solidified layer substantially reduces or eliminates the need for solvent washing to produce flake.

DETAILED DESCRIPTION OF THE INVENTION

Figure 1:
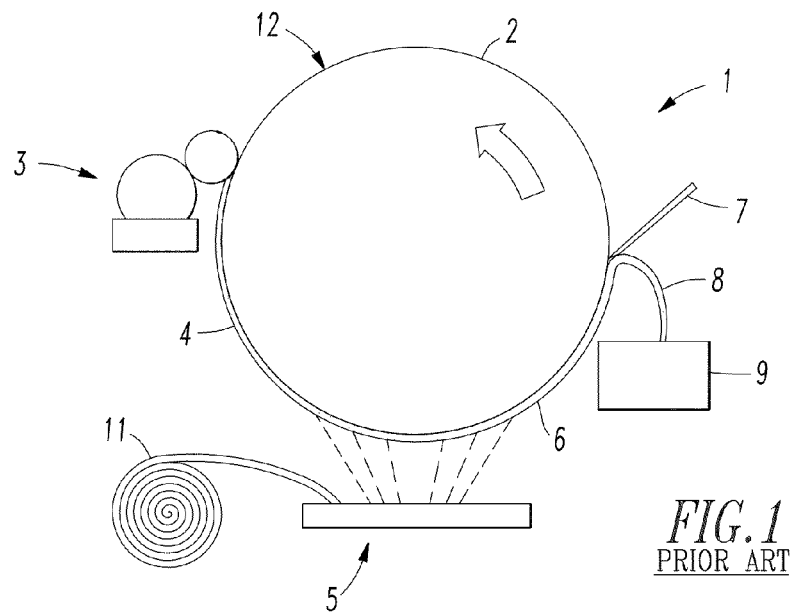
FIG. 1 is prior art vapor deposition assembly.

A prior art process for the production of metal flake includes the vacuum deposition of a metal film onto a surface, which has been coated with a dissolvable release agent. FIG. 1 shows an embodiment of one such assembly 1 for producing metal flake. A rotatable drum 12 includes a base surface 2. A coater 3 applies a release agent 4 to the base surface 2. Metal strip 11 is fed into an evaporator 5 which heats the metal strip 11 sufficiently to produce a metal vapor. The metal vapor 11 deposits on the coated surface to form a metal film 6. A doctor blade 7 removes the solid matter 8 from the base surface 2. The solid matter 8 is immersed in a solvent bath 9 to separate the metal film 6 from the release agent 4.

Harvesting of the metal flake occurs by dissolving the release agent from the metal film. Dissolution can be accelerated by agitation or heating. The metal film forms a suspension in the solvent and must be separated from the solvent to produce the metal flake. Common methods include centrifugation and evaporation. Dissolving the release agent takes time as does separating the metal flake from the solvent. Additionally, the process uses significant amounts of solvent which must be recovered. Further, scraping the solid release agent and metal film from the surface can be difficult.

To facilitate removal of the metal film/release agent from the surface, a plastic film, such as polyester film or cured polymer, can be fixed over the base substrate 2. The release agent 4 can be applied to the plastic film and the metallic layer can be deposited onto the release coating. The plastic film can be peeled from the base surface but this technique produces a quantity of waste in the form of spent base substrate. This technique also does not address the slow dissolution that can limit production speeds to only about 50 feet per minute (about 15 meters/minute). To reduce the waste stream and increase production, multiple layers of release agent/metal film can be applied over a single base substrate. This technique requires multiple coating and deposition steps often on different machines.

The present invention includes a liquid release coating to improve the production efficiency and quality of metal flakes. The liquid release coating comprises a curable compound. At least a portion of the curable compound solidifies during deposition. A major portion of the liquid release coating remains at least substantially liquid. In embodiments, the viscosity of the liquid release coating can increase.

The current invention includes a method for producing a metal flake without significant amounts of solvent and without the need for a plastic film. The method comprises depositing onto a based surface a liquid release agent comprising a curable compound. A thin film is deposited over the release agent thereby forming a multilayer structure. In embodiments, depositing the thin film includes passing the coated base substrate over at least one vacuum evaporator that produces a vapor of any material that can be vacuum deposited as a thin film coating. The thin film can include metal, such as, for example, aluminum, copper, nickel, silver, and gold, chromium, and combinations thereof, or inorganic materials such as oxides, sulfides, fluorides, and combinations thereof. Deposition can include, but not limited to, thermal evaporation, electron beam evaporation, ion beam deposition or sputtering.

Vacuum deposition onto liquids is typically very difficult or impossible because the physics of condensation do not allow the formation of extended crystalline structures on a liquid surface. Commonly known examples of vapor deposition onto liquids produce microcrystalline powders, which do not share the properties of metal flake. The current invention however includes a release coating comprising a curable compound. During the deposition step, the curable compound forms a thin solidified layer on the exposed surface of the release coating. A solidified layer means a layer that is substantial not fluid over the time-frame of deposition. A solidified layer can include a crystalline or semi-crystalline structure, a glass, or a liquid that has become so viscous that it is essentially a solid over the time frame of the process. The curable compound can solidify in response to the conditions of the deposition such as, for example, heat of vaporization, heat of condensation, radiation, or combinations thereof. Without intending to be bound by this explanation, the solidified layer reduces the molecular mobility on the release coating's surface and allows the formation of extended crystalline structures.

The solidified layer will have a thickness of at least one molecular layer. In practice, the thickness will be less than about 0.001 mm (1 µm) thick, preferably less than about 0.0001 mm (0.1 µm) thick, and most preferably is less than about 0.00001 mm (100 Å).

Curable compounds can include synthetic or natural chemicals, including monomers, dimers, trimers and oligomers. Synthetic chemicals can include polymerizable compounds such as, for example, acrylates, methacrylates, and other liquid resins. Natural chemicals can include reactive oils such as, for example, tung oil or linseed oil. At least an exposed surface of the curable compound must solidify. The rate of solidification of the surface layer caused by the deposition process can determine suitable curable compounds.

Solidification parameters can include reaction kinetics, surface energy, and adhesion to the metal flake. Reaction kinetics determines the solidification rate. Rapid kinetics can create a crosslinked polymer that cannot be easily removed from the flake in the later steps of the process. On the other hand, insufficient reactivity may not efficiently produce metal flake. A solidified layer having a low surface energy can inhibit the production of quality metal flake. Some adhesion of the solidified layer with the metal flake can be useful. Although prior art would typically remove all release material from the flake, the presence of an extremely thin solidified layer was found to add functionality to the metal flake. First, a thin solidified layer can provide corrosion protection to the metal flake. Second, a thin solidified layer can also provide a surface functionality on the exposed side of the release coating layer that improves compatibility with solvents, organics or fillers such as being used in lacquers and paints, thus improving the processing of such metal flakes in their final application.

Figure 2:
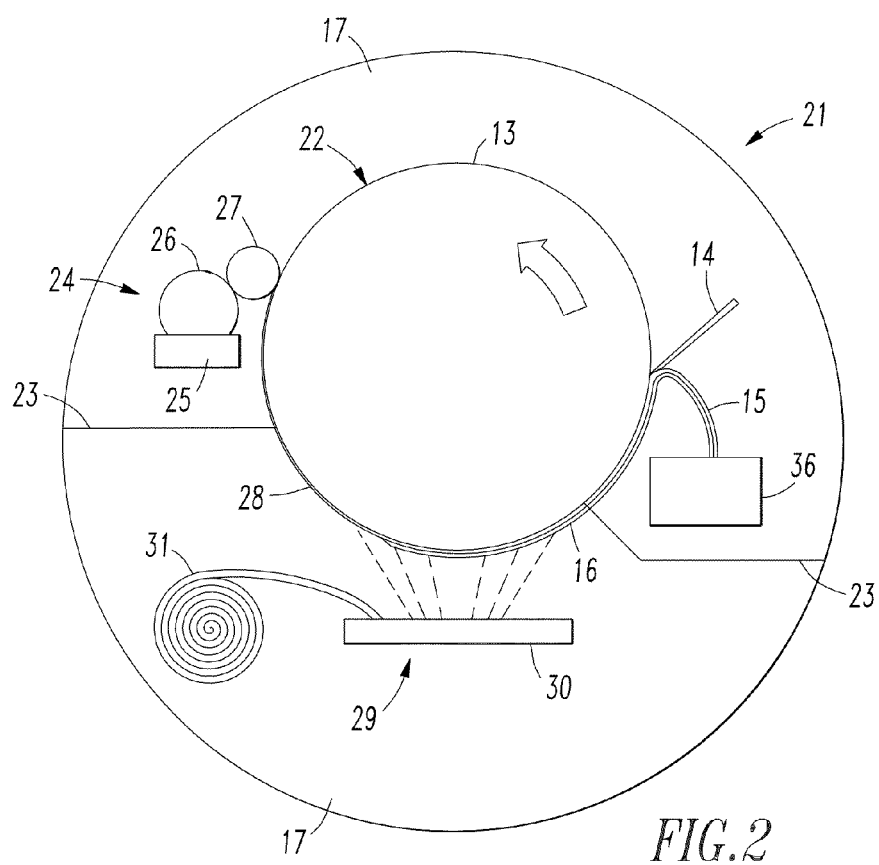
FIG. 2 is a vacuum deposition assembly of the present invention.
Figure 3:
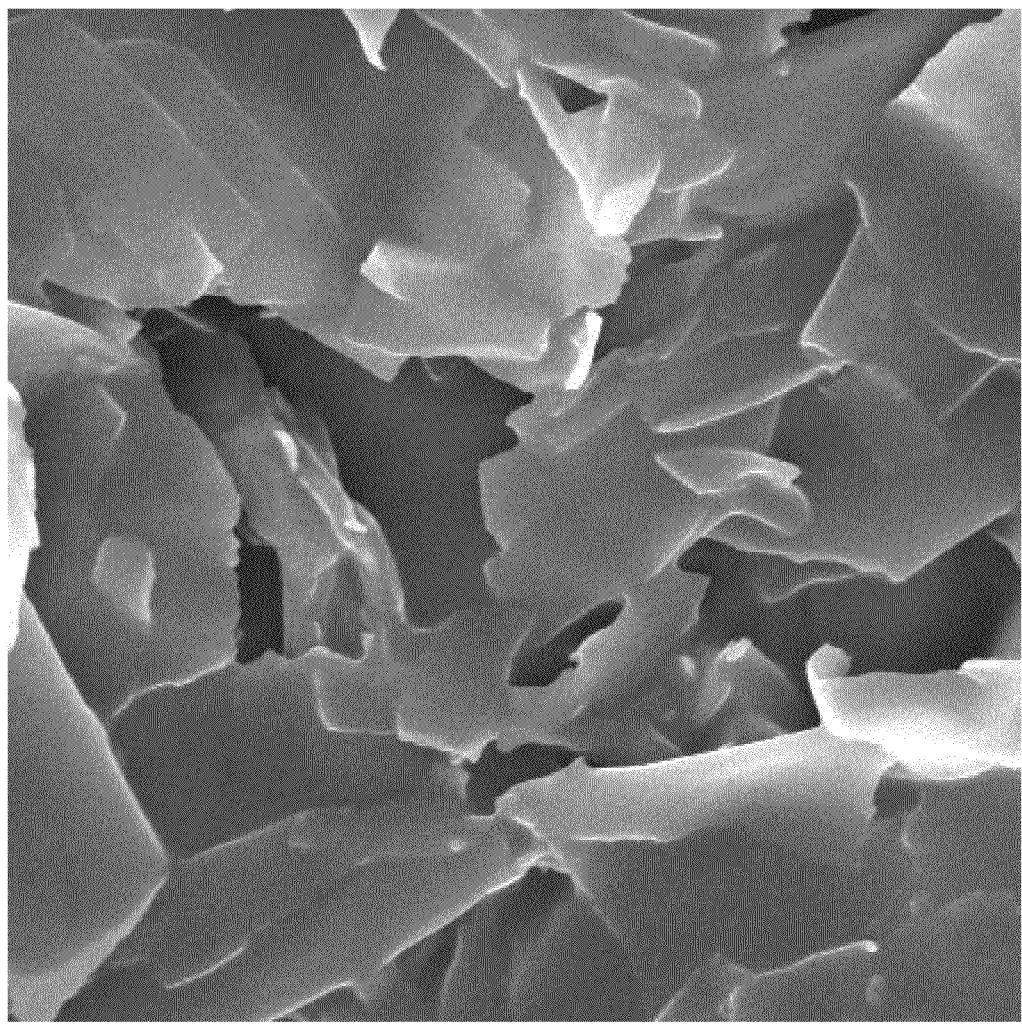
FIG. 3 shows micrographs of metal flakes made by the process of the invention.

FIG. 2 shows an embodiment of the present invention. The embodiment comprises a vacuum chamber 21, a rotatable drum 22, a coater 24 for the release agent, and at least one applicator 29. The vacuum chamber 21 can maintain a low-pressure environment suitable for the deposition of thin film coatings. In embodiments, the pressure in the vacuum chamber will be no more than 0.1 millitorr, and preferably between 0.001 and 0.01 millitorr. The vacuum chamber 21 can include plurality of subchambers 17, created by divisions 23 within the vacuum chamber 21. Each subchamber 17 may be controlled separately with respect to pressure, gas flow rates and gas compositions.

The rotatable drum 22 can be temperature controlled, for example, it can be cooled to resist heat created by the deposition applicator. The preferred temperature of the rotatable drum 22 will be sufficiently high so the release agent 4 does not freeze but sufficiently low to prevent excessive polymerization of the release agent. The permissibly range of temperatures will depend on the release agent and kinetics of the reaction.

The coater 3 can include any mechanism for applying a liquid to the surface 13 of the rotable drum 22. Preferably, the coater 3 can control the thickness at which the liquid release coating 28 is applied to the surface 13 of the rotatable drum 22. Embodiments can include a gravure coater comprising a reservoir 25 containing the liquid release agent. A pickup roller 26 rotates at least partially submerged in the reservoir 25. The pickup roller 26 typically comprises a gravure surface that meters the amount of reactive agent. A metering blade (not shown) can also be used to remove excess reactive agent from the pickup roller 26. The pickup roller 26 transfers the reactive agent to the application roller 27 which transfers the reactive agent to the surface 13 of the rotatable drum 22 creating a layer of liquid release coating 28 on the rotatable drum 22. Of course, the coater 3 can include any suitable application method known to one skilled in the art, including without limitation slot dies, curtain coatings, evaporation, and condensation.

After applying the liquid release agent 28 to the surface 13 of the rotatable drum 22, the liquid release agent 28 is exposed to the applicator 29. The applicator 29 can include any process for depositing a thin film onto the release agent thereby forming a multilayer structure 15. The applicator can include, for example, electron beam evaporation, sputtering, ion beam evaporation, and thermal evaporation. In embodiments, the applicator 29 includes a evaporator 30 into which a wire 31 of the desired material of the thin film is continuously fed. The evaporator 30 can include, for example, a ceramic heater. By way of example, when the desired material consists essentially of aluminum, the evaporator 30 can include a ceramic heater comprising a sintered block of the boron nitride and titanium diboride. Passing an electric current through the block generates sufficient heat to melt the aluminum wire. In combination with low pressure in the vacuum chamber, the aluminum vaporizes.

The exposure of the liquid release agent 28 to the applicator 29 causes a reaction on the exposed surface of the release agent and creates a solidified layer that is receptive to condensation of the vapor of the desired material. The vapor condenses on the solidified surface forming a continuous layer of thin film 16. In embodiments, the thin film may adhere to the solidified layer of the release agent. Parameters affecting the quality and appearance of the thin flake that is produced by the process include the thickness of the thin film 16, the heat of the applicator 29, the feed rate at which the wire 31 is fed into the evaporator 30, and the pressure and gas composition in the vacuum system 21.

The multilayer structure 15 comprising the thin film 16 and the liquid release agent 28 is removed from the base substrate. Removal can be effected with a doctor blade 14. The doctor blade 14 is disposed at an angle of contact with the rotatable drum 22 to permit removal of the multilayer structure 15 of liquid release agent 28 and thin film 16 from the rotatable drum 22. Preferably, the liquid release agent 28 remains substantially a liquid so that the force needed to remove the combination from the rotatable drum 22 is reduced from prior art, which used solid release agents. Advantageously, such low forces reduce heating at the doctor blade 14 so that further solidification of the liquid release agent 28 is also reduced.

The multilayer structure 15 of the liquid release agent 28 and thin film 16 is collected in a collecting system 36. In embodiments, the collecting system 36 can be removed from the vacuum chamber 21 without breaking the vacuum. In other embodiments, the collecting system 36 will be emptied after either the release agent or the desired material is depleted and must be replenished. After removal of the multilayer structure, the multilayer structure can be processed with methods typical to the art of processing thin flakes. Because only a small portion of the release agent solidified, the excess release agent can be readily dissolved in a suitable solvent such as, for example, an organic solvent, surfactant solution, acidic solution, and basic solution. The organic solvent can include a ketone, ether, aldehyde, alcohol, acetate, hydrocarbon, and combinations thereof. Common solvents include acetone, ethyl acetate, citric acid, and soapy water. Mixing and agitation is typically enough to dilute the excess liquid release agent to concentrations that allow further processing and separation of the thin flakes by common means such as centrifugation. In embodiments, a layer of solidified release agent can remain attached to the metal flake. This can improve properties of the thin flake without impairing optical properties or aesthetics.

EXAMPLE

A gravure coater applied a release agent comprising tung oil to a rotatable drum contained in a vacuum chamber having two subchambers. A metering roll ensured the thickness of the release agent on the rotating drum was about 5 µm. The surface of the coating drum was cooled to about 5° C. The release agent was coated in a first subchamber at a pressure of about 0.03 Torr. A second subchamber contained the applicator and was held at a pressure of about $5 \times 10^{-5}$ Torr. The desired material was aluminum metal at 99.8% purity. The speed of surface of the rotatable drum was about 4 meters per second, and the evaporation of aluminum was synchronized to produce a metal film with an optical density of 2.2, that is, a thickness of about 30 nm. Aluminum was deposited for approximately 30 minutes. The aluminum formed a shiny layer on the liquid tung oil coating. The combination of the metal layer and tung oil was removed from the rotating drum using a doctor blade and the combination was collected in a container. The combination formed a paste similar in appearance to metallic paint. The flakes were separated from the tung oil using ethyl acetate to dilute the liquid, and filtering through a paper filter. The example yielded flat flakes with lateral dimensions between 20 and 100 µm and a thickness of about 30 nm. A sample of the flakes is shown in an electron scanning micrograph in FIG. 2.

What is believed to be the best mode of the invention has been described above. However, it will be apparent to those skilled in the art that numerous variations of the type described could be made to the present invention without departing from the spirit of the invention. The scope of the present invention is defined by the broad general meaning of the terms in which the claims are expressed.

The invention claimed is:

1. A process for producing thin flake particles comprising:
   a) Applying a liquid release agent onto a surface of a base substrate, the liquid release agent comprising a curable compound, wherein the liquid release agent defines an exposed surface that solidifies during deposition while a major portion of the liquid release agent remains a liquid;
   b) Forming a multilayer structure by depositing at least one layer of a film onto the exposed surface;
   c) Removing the multilayer structure from the base substrate;
   d) Collecting the multilayer structure; and
   e) Extracting the liquid release agent from the film with a suitable solvent to yield the thin flake.

2. The process of claim 1, wherein the base substrate is selected from a group consisting of a rotatable drum, a web, and combinations thereof.

3. The process of claim 2, wherein steps (a) through (e) are performed continuously over the base substrate.

4. The process of claim 1, wherein steps (a) and (b) are repeated at least once before proceeding to step (c).

5. The process of claim 1, wherein the curable compound is selected from a group consisting of a monomer, dimer, trimer, oligomer, and combinations thereof.

6. The process of claim 1, wherein the curable compound is selected from a group consisting of synthetic organic compounds, natural organic compounds, and combinations thereof.

7. The process of claim 6, wherein the synthetic organic compound is selected from a group consisting of acrylates, methacrylates, and combinations thereof.

8. The process of claim 6, wherein the natural organic compound is selected from a group consisting of tong oil, linseed oil, and combinations thereof.

9. The process of claim 1, wherein the liquid release agent is applied to the surface of the base substrate with a coater selected from a group consisting of a gravure coater, a slot coater, a die coater, flash evaporator, and combinations thereof.

10. The process of claim 1, wherein depositing the film onto the liquid release agent uses a process selected from a group consisting of thermal evaporation, electron beam evaporation, condensation, sputtering, and combinations thereof.

11. The process of claim 1, wherein the film comprises a material selected from a group consisting of a metal, an inorganic material, and combinations thereof.

12. The process of claim 11, wherein the metal is selected from aluminum, copper, nickel, silver, gold, chromium, and combinations thereof.

13. The process of claim 11, wherein the inorganic material is selected from a group consisting of oxides, sulfides, fluorides, and combinations thereof.

14. The process of claim 13, wherein the inorganic material is selected from zinc sulfide, alumina, titanic, and combinations thereof.

15. The process of claim 1, wherein removing the multilayer structure from the base substrate uses a doctor blade.

16. The process of claim 1, wherein the suitable solvent is selected from a group consisting of an organic solvent, a surfactant solution, an acidic solution, a basic solution, and combinations thereof.

17. The process of claim 16, wherein the organic solvent is selected from a group consisting of a ketone, ether, aldehyde, alcohol, acetate, hydrocarbon, and combinations thereof.

18. The process of claim 1, wherein the base substrate comprises a web, and the web is spooled between two reels and the process is carried out continuously over the web.

19. A process for producing thin flake particles comprising:
   a) Applying a liquid release agent onto a surface of a base substrate selected from a group consisting of a rotatable drum, a web, and combinations thereof, the liquid release agent comprising a curable compound and defining an exposed surface that solidifies during deposition while a major portion of the liquid release agent remains a liquid;
   b) Forming a multilayer structure by depositing at least one layer of a film onto the exposed surface;
   c) Removing the multilayer structure from the base substrate;
   d) Collecting the multilayer structure; and
   e) Extracting the liquid release agent from the film with a suitable solvent to yield the thin flake.

* * * * *